United States Patent Office 3,302,545
Patented Feb. 7, 1967

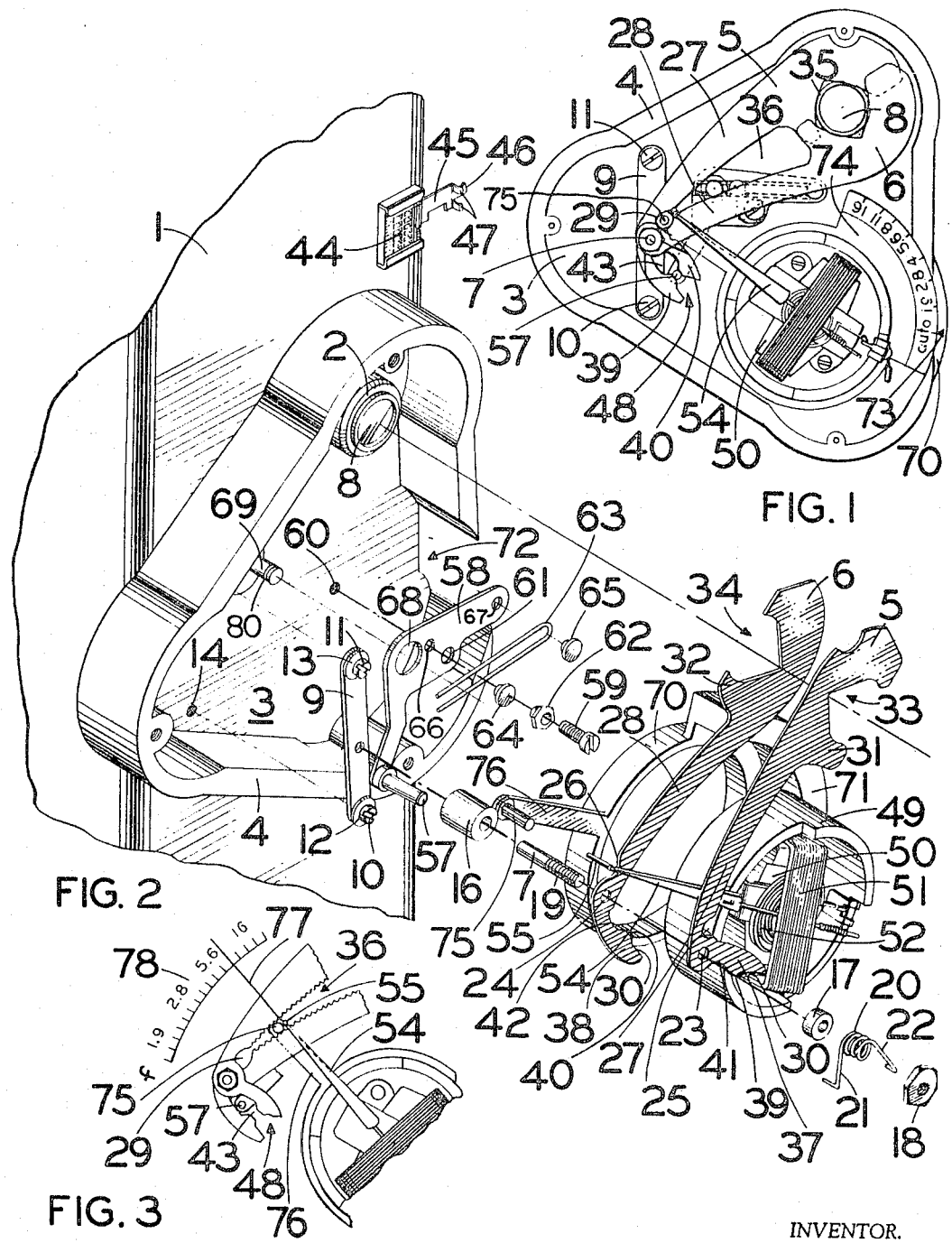

3,302,545
AUTOMATIC EXPOSURE CONTROL FOR CAMERA
Hans A. Bakke, Swampscott, Mass., assignor to General
Electric Company, a corporation of New York
Filed Oct. 20, 1958, Ser. No. 768,454
24 Claims. (Cl. 95—64)

This invention relates to automatic exposure control apparatus for photographic cameras and, more particularly, to a control system utilizing a photoelectric cell as a means for measuring the ambient illumination and automatically adjusting the exposure control mechanism in response to the level of illumination to secure a correctly exposed photograph.

A large number of arrangements have been suggested for automatic diaphragm control systems, but only a very small percentage have ever realized any commercial use or significance, as has the present invention, because of the inherent complexity and limitations therein. Systems have been proposed and used utilizing an electric instrument which moves in response to the current output of a photovoltaic cell to produce a movement in response to the changes of level of ambient illumination or incident light level. Such movements have been utilized to either actuate iris diaphragm light regulating means associated with the camera lens through a mechanical linkage arrangement or have utilized one or more vanes mounted directly on the moving element of the electric instrument to provide a diaphragm control without the intermediary of mechanical coupling. One inherent problem in such arrangements is the loading of the delicate electric instrument, especially if accuracy and dependability of operation are to be obtained. Since automatic diaphragm control arrangements are especially desirable for use in portable cameras operated by amateurs or less experienced persons, the delicate nature of the photoelectric instrument has provided problems of operation in systems utilizing this as the only source of motive power.

Another problem encountered in such devices is that the camera operator may wish to discontinue automatic operation and operate the camera in the manual conventional manner. Under such conditions and at other times it is desirable to be able to utilize the photoelectric instrument to give indications for lens settings in a manner similar to a conventional photographic exposure meter.

It is an object of this invention to provide an improved photoelectric automatic diaphragm control adapted for use in a movie camera which is automatically regulated in accordance with the incident light level and which minimizes the loading of the electric instrument.

It is a further object to provide an automatic diaphragm control which is simplified in structure, simple to operate, and rugged in construction so as to be reliable and suitable for use by amateur photographers in portable cameras.

It is still another object of this invention to provide an improved photoelectric automatic diaphragm system for a camera in which a direct reading of the correct lens opening is obtainable.

It is yet another object of this invention to provide an automatic diaphragm control arrangement in which automatic operation may be discontinued and manual control may be commenced at will by the operator.

Further objects and advantages of this invention will become apparent as the following description proceeds, and the features of novelty which characterize this invention will be pointed out with particularity in the claims annexed to and forming a part of this specification.

In accordance with one form of this invention, an automatic diaphragm control is provided in which the electric instrument is used as an adjustable stop member or control to determine the relative positioning of a pair of spring-biased scissors-like vane members which overlie the lens aperture. The pair of vanes covers the lens aperture an amount inversely proportional to the level of illumination and the control member or pin is positioned between the vanes such that as the vanes attempt to close upon one another, they clamp on the control member pin and are maintained in a position corresponding to the instrument pointer deflection. Until the camera is operated, the vanes are separated such that the control pin is free to move without restriction in accordance with the incident light level and actuation of the camera mechanism allows the vanes to close an amount determined by the positioning of the control member. A manual f-stop setting override arrangement is provided through use of a manual override pin which is larger in diameter than the automatic control pin so that the amount of closure of the pair of vanes will be determined by the manual override pin when it is in the region between the two vanes. During automatic operation, the manual control pin is moved to a recess and out of the control region between the vanes.

For a better understanding of this invention, reference may be had to the accompanying drawings in which:

FIGURE 1 is a front view showing a portion of a camera embodying the invention;

FIGURE 2 is an expanded perspective view of the arrangement illustrated in FIGURE 1 and includes additional features; and FIGURE 3 is a fragmentary view illustrating the control during manual operation and additional features of the invention.

Referring to FIGURES 1 and 2, there is shown a portion of the case of a motion picture camera 1 having associated therewith a lens assembly 2 disposed within a compartment 3 formed in part by surrounding wall 4 coneniently cast as part of case 1. The shutter vanes 5 and 6 are pivotally mounted on stud 7 such that they extend within the compartment 3 with portions thereof overlying lens 8. Pivot 7 is riveted to a strip member 9 which in turn is secured to case 1 by screws 10 and 11, washers 12 and 13, and threaded holes such as 14 of case portion 1. The vanes 5 and 6 are spaced from strip member 9 by spacer 16 which concentrically surrounds stud 7 and are prevented from moving axially by spacer 17 and nut 18 which engages the threaded end 19 of stud 7. The vanes are normally urged together through the resiliency of coil spring 20 surrounding stud 7 and interposed between spacer 17 and nut 18. The arms 21 and 22 of coil spring 20 bear against the outer edges of vanes 5 and 6 to urge them toward one another. Screws 10 and 11 pass through holes (not shown) in strip member 9 which are larger than the diameter of the screws, enabling a small amount of play to facilitate the adjustment and exact positioning of stud 7.

Since the vanes 5 and 6 are not directly actuated by the photoelectric mechanism, they will not overload the photoelectric instrument and may be stamped from relatively sturdy material in the shape as shown in FIGURES 1 and 2. The vanes extend from the pivot holes 23 and 24 toward the lens with the opposed arcuate recesses 25 and 26 of shank portions 27 and 28 forming an opening 29 therebetween. The enlarged ends 31 and 32 of vanes 5 and 6 have substantially arcuate recesses 33 and 34 therein to form an opening 35 which overlies the lens 8 and has dimensions which will vary with the relative movement of vanes 5 and 6. As shown in FIGURE 2, the portions of the enlarged ends 31 and 32 surrounding the recesses 33 and 34 overlap even when the vanes are in a position corresponding to maximum lens opening to form the substantially circular opening or aperture 35 therebetween. It should be noted that the shank portions 27 and 28 form an arcuate substantially triangular opening 36 therebetween such that the opening will diminish in scissors fashion as the vanes are moved toward one another.

The ends 37 and 38 of vanes 5 and 6 remote from the lens 8 also comprises a scissors-like arrangement and are utilized for actuation of the vanes. While these ends could be fashioned as linear extensions of shank portions 27 and 28, they are formed at substantially right angles in order to provide a come compact arrangement of the mechanism. The ends 37 and 38 have projections 39 and 40 on the inner edges thereof and adjacent arcuate recesses 41 and 42 forming opening 43 therebetween on one side and adjacent arcuate recesses 30 forming opening 48 on the other side of projections 39 and 40. The ends 37 and 38 operate in a scissors fashion similar to shanks 27 and 28 but in an opposite manner; that is, as the spring 20 which is associated with shank portions 27 and 28 move the shank portions together, the triangular opening 36 therebetween becomes smaller while the opening 43 between ends 37 and 38 becomes larger.

Mounted on case 1 exterior of compartment 3 is the light meter lens opening 44 behind which, in the interior of the camera, is mounted a photovoltaic cell (not shown). A hinged plate member 45 may be conveniently manipulated by tab portion 46 to selectively cover a portion of the light meter lens opening 44 in order to vary the exposed area of the cell and thus vary the sensitivity of the light meter to compensate for variations of film speed. A pair of resilient ears 47 are provided to lock the plate member 45 in position across the light meter lens opening 44.

Since the specific details of the electric instrument microammeter 50 form no part of the subject invention, a detailed description thereof will be omitted in the interest of brevity and clarity. It is believed that a rather general description is adequate to illustrate the principle of the invention in that many types of suitable electric instruments are well known in the art.

Electric instrument 50 is electrically connected to the photovoltaic cell (not shown) such that the rotatable coil 51 will move in response to electric currents flowing therein against the torque of coil spring 52 an amount determined by the magnitude of the current which is in turn determined by the level of illumination reaching the photovoltaic cell. The deflecting torque is produced by the interaction of the magnetic fields produced by current flow through the rotatable coil 51 and the magnetic field produced by a permanent magnet associated therewith in a manner well known in the art. A pointer or control arm 54 is rigidly affixed to rotatable coil 51 for rotation therewith. The electric instrument 50 is positioned within the compartment 3 such that the control pin 55 extends downwardly from the end of control arm 54 at right angles thereto and moves in the triangular opening 36 formed between the shutter vanes 5 and 6. There has thus been provided a control pin 55 moving between the vanes 5 and 6 in response to the level of illumination reaching the photoelectric instrument.

Except during the actual operation of the camera, the shutter vanes 5 and 6 are maintained in the fully open position by actuator pin 57 to enable the electric instrument 50, including its associated pointer 54 and control pin 55, to move freely within triangular opening 36 without loading the photoelectric instrument. Actuator pin 57 is normally maintained in the position between the projections 39 and 40 as shown in FIGURE 1 and is rigidly secured to the actuator lever 58 which is fulcrumed about fulcrum pin or screw 59 which is secured to case 1 at threaded hole 60. Fulcrum pin 59 passes through hole 61 in actuator lever 58 with bushing 62 interposed between the pin and lever. Bushing 62 has an eccentric opening passing therethrough such that rotation of the bushing provides a small amount of adjustment of the actuator lever 58 to properly locate the actuator pin 57 attached to the end of the lever. Actuator lever 58 is positioned behind vanes 5 and 6 and spaced from the camera case 1 by a U-shaped member 63 conveniently formed of wire and riveted to the actuator lever 58 by rivets 64 and 65 passing therethrough and through openings 66 and 67. The open end of the U-shaped member 63 is contiguous to the camera actuator opening 68. Actuator pin 69 passes freely through opening 68 and has a circumferential groove 80 adapted to engage the open ends of the U-shaped member 63. Camera actuator pin 69 is mechanically coupled to the camera operating mechanism such that when the camera is operated to expose a single frame pin 69 moves upward and during continuous operation pin 69 moves downward. Actuator lever 58 is rotated about fulcrum pin 59 in response to such movement, while U-shaped member 63 acts as a flexible override to enable the lever 58 to amplify the movement of camera actuator pin 69 and provide rapid action of the vanes before the film mechanism (not shown) begins to operate.

Actuator lever 58 is spring biased so as to normally assume the position as shown in FIGURE 2 wherein the vane actuator pin 57 is between the projections 39 and 40 of shutter vanes 5 and 6 to maintain the vanes in a fully open position, and control pin 55 is free to move within opening 36 in response to the incident light level. During camera operation, actuator pin 57 is moved clockwise into opening 43 on single frame operation and counterclockwise into the opening 48 on continuous operation. When actuator pin 57 is moved to either opening 43 or opening 48, the resiliency of spring 20 closes vanes 5 and 6 to the position determined by control pin 55, the positioning of which is in turn determined by the ambient level of illumination reaching the photovoltaic cell associated with electric instrument 50. It should be noted that the closer the control pin 55 approaches lens 8, corresponding to larger deflections of the electric instrument 50 and higher incident light intensity levels, the closer the vaes will be able to approach one another.

While cameras operating with the automatic diaphragm control described above prove accurate and reliable in operation, it is often desirable to obtain certain desired effects by controlling the lens opening independent of the automatic control system. A manual $f$-stop override mechanism is provided and includes a ring-formed member 70 rotatable about and concentrically surrounding the flux ring 49 of electric instrument 50. Ring member 70 has a raised portion 71 adapted to project through the opening 72 of wall member 4 as best shown in FIGURE 2. Suitably affixed to raised portion 71 is an index or arrow 73 which cooperates with a fixed $f$-stop scale 74 associated with the cover member (not shown) of compartment 3. As shown in FIGURE 1, the $f$-stop scale has a position marked "Auto" which when aligned with the index 73 enables automatic operation. During automatic operation, the ring member 70 is rotated such that override pin 75 attached through the intermediary of override arm 76 is positioned within the override opening 29 and out of the region between shutter vanes 5 and 6 defined by triangular opening 36. The override arm 76 is positioned beneath the vanes with the override pin 75 extending at right angles thereto and projecting through the plane defined by the shutter vanes 5 and 6.

For manual override operation, ring member 70 is rotated in a clockwise direction to bring the desired manual $f$-stop marking into alignment with the index mark 73 and cause a corresponding clockwise rotation of override pin 75. Override pin 75 is substantially larger in diameter than control pin 55, and since the rings upon which pins 55 and 75 rotate are concentric, the pins describe the same arc within the triangular opening 36. During manual operation, override pin 75 pushes control pin 55 into the opening 36, with control pin 55 being free to move in the region between the override pin 75 and the end of opening 36 adjacent to lens 8.

During manual override operation, operation of the camera actuates pin 69 which in turn actuates lever 58 to move actuator pin 57 from between projections 39 and 40.

The spring 20 is then free to move vanes 5 and 6 toward one another until stopped by the override pin 75 rather than being stopped by the control pin 55. It is thus apparent that the positioning of the vanes and the resultant lens aperture 35 is determined by the override pin 75 rather than the control pin 55.

FIGURE 3 shows the relative positioning of the override pin 75 and control pin 55 during manual override operation of the camera wherein actuator pin 57 has been moved to opening 43. FIGURE 3 also shows a slight variation of the vanes whereby the inner edges have a saw-tooth or serrated contour in order to more easily facilitate the clamping of pins 55 or 75. While both or one of the inside edges of vanes 5 and 6 could be serrated, it has been found in practice that the relatively small angle between the paths of pins 55 and 75 and the inside edges of vanes 5 and 6 provides sufficient friction to prevent unwanted relative movement of the parts during operation of the camera without the necessity of serrating the inner edges.

When camera operation, either automatic or manual, is discontinued, the spring biasing arrangement associated with actuator lever 58 causes pin 57 to again assume the position between the projections 39 and 40 to again maintain the vanes in the fully opened position.

Since the instrument pointer is free to move except during the actual operation of the camera, the pointer or control arm 54 might conveniently be provided with a portion 77 which extends beyond the control pin 55 to cooperate with the visible f-stop scale 78 as shown in FIGURE 3, enabling the use of the camera as a conventional exposure meter to provide visual readings suitable for use with the camera itself or another camera. The scale 78 is not shown in FIGURE 1 but may be conveniently affixed within compartment 3 and visible behind a transparent plate in the compartment cover (not shown).

Therefore, while particular embodiments of the subject invention have been shown and described herein, it is in the nature of description rather than limitation, and it will occur to those skilled in the art that various changes, modifications, and combinations may be made within the province of the appended claims and without departing either in spirit or scope from the invention in its broader aspects.

What I claim as new and desire to secure by Letters Patent of the United States is:

1. An automatic photographic lens exposure regulator comprising: a photoelectric member controlled in response to variations of the incident light level, a pair of vanes having portions defining an aperture therebetween the size of which varies with the relative position of said vanes, said vanes being positioned such that said aperture is interposed between the light and the lens being controlled, an actuator member which separates said vanes and enables said control member to move therebetween and out of contact with said vanes in response to said light level, whereby upon actuation of said actuator said vanes are no longer separated thereby, and means to move said vanes relative to one another upon actuation of the actuator an amount determined by the position of said control member through said vanes contacting said control member.

2. An automatic photographic lens exposure regulator comprising: a photoelectric member controlled in response to variations of the incident light level, a pair of pivoted vanes, each vane located on an opposite side of said control member and having portions defining an aperture the size of which varies with the relative position of said vanes and a substantially triangular opening therebetween, said vanes being biased toward one another and positioned such that said aperture is interposed between the light and the lens being controlled, and an actuator member which separates said vanes and enables said control member to move in said triangular opening out of contact with said vanes in response to said light level, said actuator upon actuation thereof no longer separating said vanes so that said vanes are moved in scissors fashion by the bias applied thereto toward one another until stopped by said control member therebetween.

3. An automatic photographic lens exposure regulator comprising: a photoelectric member moving in response to variations of the incident light level and having a control member affixed thereto, a pair of pivoted vanes adapted to move in scissors fashion and having portions therebetween defining an aperture the size of which varies with the relative position of said vanes, said vanes being biased toward one another and positioned such that said aperture is interposed between the light and the lens being controlled, said vanes having mating ridge portions therebetween, and an actuator member which separates said vanes when interposed between said ridge portions and enables said control member to move between and out of contact with said vanes in response to said light level, such that actuation of said actuator member from between and out of contact with said ridge portions allows said vanes to be moved by the bias applied thereto relatively toward one another until stopped by said control member therebetween.

4. An automatic photographic lens exposure regulator comprising: a photoelectric member moving in response to variations of the incident light level and having a control member affixed thereto, a pair of pivoted vanes adapted to move in scissors fashion and having portions therebetween defining a substantially circular aperture the size of which varies with the relative position of said vanes and a substantially triangular opening, said vanes being biased toward one another by a spring member and positioned such that said aperture is interposed between the light and the lens being controlled, said vanes having mating ridge portions therebetween, and an actuator member which separates said vanes when interposed between and out of contact with said ridge members and enables said control member to move between said vanes in said opening in response to said light level, such that movement of said actuator member from between said ridge portions allows said vanes to be moved by the bias applied thereto toward one another an amount determined by the position of said control member.

5. An automatic photographic lens exposure regulator having a manual override comprising: a photoelectric control member moving in response to the incident light level, a pair of pivoted vanes having portions therebetween defining an aperture the size of which varies with the relative position of said vanes, said vanes being positioned such that said opening is interposed between the light and the lens being controlled, an actuator member which separates said vanes and enables said control member to move therebetween in response to said light level, whereby upon actuation of said actuator member during automatic operation said vanes are moved relative to one another an amount determined by the position of said control member, and a manual override mechanism including an override member which is adapted to be moved along substantially the same path as said control member to determine the movement of said vanes upon actuation of said actuation member.

6. An automatic photographic lens exposure regulator having a manual override comprising: a photoelectric control member moving in response to the incident light level, a pair of biased pivoted vanes having portions defining an aperture the size of which varies with the relative position of said vanes and a substantially triangular opening therebetween, said vanes being interposed between the light and the lens being controlled, an actuator member which separates said vanes and enables said control member to move in said triangular opening in response to said light level, whereby upon actuation of the regulator during automatic operation said vanes are moved relative to one another in scissors fashion by the bias applied thereto until stopped by said control member therebetween, and a manual override mechanism including an override member which extends further across the said second opening than said control member and which is adapted to be moved along substantially the same path as said control member to determine the movement of said vanes upon actuation of said actuator member.

7. An automatic photographic lens exposure regulator having a manual override comprising: a photoelectric control member moving in response to the incident light level, a pair of biased pivoted vanes having portions defining an aperture the size of which varies with the relative position of said vanes and a substantially triangular opening therebetween, said vanes being positioned such that said aperture is interposed between the light and the lens being controlled, an actuator member which separates said vanes and enables said control member to move in said triangular opening in response to said light level, whereby upon actuation of said regulator during automatic operation said vanes are moved relative to one another in scissors fashion by the bias applied thereto until stopped by said control member therebetween, and a manual override mechanism including an override member positioned between said control member and the pivot point of said vanes which extends further across the said second opening than said control member and which is adapted to be moved along substantially the same path as said control member to determine the movement of said vanes upon actuation of said actuator member.

8. An automatic photographic lens exposure regulator having a manual override comprising: a photoelectric control member moving in response to the incident light level, a pair of biased pivoted vanes adapted to move in scissors fashion and having portions defining a first substantially circular aperture the size of which varies with the relative position of said vanes and a substantially triangular opening therebetween, said vanes being biased toward one another by a spring member and positioned such that said aperture is interposed between the light and the lens being controlled, said vanes having mating ridge portions therebetween, an actuator member which separates said vanes when interposed between said ridge members and enables said control member to move between said vanes in response to said light level, such that actuation of said actuator member during automatic operation from between said ridge members enables said vanes to be moved toward one another by the bias applied thereto until stopped by said control member therebetween, and a manual override mechanism including an override member positioned between said control member and the pivot of said vanes which extends further across the said opening than said control member and which is adapted to be moved along substantially the same path as said control member to determine the movement of said vanes upon actuation of said actuator member.

9. An automatic photographic lens exposure regulator having a manual override comprising: a photoelectric control member moving in response to variations of the incident light level, a pair of biased pivoted vanes adapted to move in scissors fashion and having portions extending on either side of a pivot member, the vanes being substantially identical and having corresponding portions defining a substantially circular aperture the size of which varies with the relative position of said vanes and a substantially triangular opening therebetween, said vanes being biased toward one another by a spring member positioned such that said aperture is interposed between the light and the lens being controlled, said vanes having corresponding substantially identical portions on the other side of said pivot member which are at substantially right angles to said first portions and have ridge portions therebetween, an acuator member which separates said vanes when interposed between said ridge members and enables said control member to move between said vanes in response to said light level, such that actuation of said actuator member during automatic operation from between said ridge members enables said vanes to be moved toward one another by the spring bias applied thereto until stopped by said control pin therebetween, and a manual override mechanism including an override pin positioned between said control member and the pivot member and which is larger in diameter than said control member, said override pin being adapted to be moved along substantially the same path as said control member to determine the movement of said vanes upon actuation of said actuator member.

10. An automatic photographic lens exposure regulator having a manual override comprising: a photoelectric member moving in response to the incident light level and having a control member attached thereto, a pair of biased pivoted vanes having portions defining an aperture the size of which varies with the relative position of said vanes and an opening therebetween, said vanes being positioned such that said aperture is interposed between the light and the lens being controlled, an actuator member which separates said vanes and enables said control member to move between said vanes in response to said light level, such that during automatic operation movement of said actuator member allows said vanes to be moved by the bias applied thereto toward one another an amount determined by the position of said control member, and a manual override mechanism including an override pin which is positioned between said control member and the pivot point of said vanes, said override pin being larger in diameter than said control member and connected to an override indicating member which concentrically surrounds the said photoelectric member, and a scale associated with said indicating member to indicate the positioning of the manual override mechanism, said override pin being adapted to be moved along substantially the same path as said control member to determine the movement of said vanes upon actuation of said actuator member.

11. An automatic photographic lens exposure regulator for use in combination with a camera operating mechanism comprising: a camera housing, a photocell positioned by said camera housing, an electric instrument controlled by said photocell and including a rotatable pointer moving in response to the level of light illuminating the photocell, a camera lens supported by said housing, a pair of relatively movable members the position of which determines the size of a variable lens opening formed in part by a portion of at least one of the members, said variable lens opening being contiguous to said lens to control the light passing therethrough, another portion of said relatively movable members forming therebetween a tapered opening within which a portion of said pointer may move, said pointer providing indications which vary in accordance with the lght level, and a camera actuator mechanism which when actuated actuates said camera operating mechanism and moves said pair of relatively movable members toward each other, the movement of said members and said pointer being stopped during camera operation by the clamping of said pointer between said relatively movable members, the position of said pointer within said tapered opening thus determining the amount of relative movement of said movable members upon actuation thereof, thereby adjusting said variable opening upon actuation of the camera mechanism in accordance with the light level, said camera operating mechanism including means to separate said movable members prior to and after camera operation enabling minimum instrument loading and indications by said pointer during such periods.

12. In a camera having a lens system for focusing an image of a viewed scene onto a photosensitive surface; a photocell positioned for energization by said scene; an electric measuring instrument having a pivoted coil connected to said cell and energized thereby to assume an angular position as a function of the intensity of said light; a pointer driven by said coil; an actuating device accessible to the camera operator; at least one movable diaphragm vane forming an exposure aperture aligned with said lens system, the size of said aperture being a function of the position of said vane; and sensing means connected to said vane for movement in a predetermined path to sense the position of said pointer upon movement of said vane, for determining the size of said aperture; an arrangement for positioning said vane, comprising: a first spring normally maintaining said actuating device in an initial position and adapted to be overcome by manual movement of said device away from said initial position; a second spring opposed to said first spring and having a force lighter than the force of said first spring, for moving said vane and for moving said sensing means into engagement with said pointer in response to movement of said actuating device away from said initial position; override means adapted for movement into the path of said sensing means for intercepting said sensing means irrespective of the position of said pointer; and manually operable selecting means coupled to said override means for moving the latter into said path.

13. In a camera having a lens system for focusing an image of a viewed scene onto a photosensitive surface; a photoelectric-to-mechanical transducer positioned for energization by light from said scene, with a mechanical output member constituting a part of said transducer and positioned thereby as a function of the intensity of said light; adjustable means aligned with said lens system for regulating the exposure of said photosensitive surface; and an actuating device accessible to the camera operator; the combination comprising: means for temporarily operating said actuating device; driving means coupled to said regulating means and operable, in response to operation of said actuating device, for yieldably driving a part of said regulating means through a predetermined path into engagement with said output member to limit the adjustment of said regulating means as a function of the position of said output member; restoring means separate from said driving means for restoring said actuating device to its unoperated condition following operation thereof, said restoring means having a force greater than the force of said driving means; override means adapted to be moved into and out of the path of said part of the regulating means and operable, upon being into said path, for intercepting said part to limit the adjustment of said regulating means irrespective of the position of said output member; and manually operable selecting means coupled to said override means for moving the latter into and out of said path.

14. In a camera having means for focusing an image of a photographic subject onto a photosensitive surface, exposure control means comprising, in combination: an exposure meter adapted to be energized by light from said subject and having a control member moving as a function of the intensity of said light; at least one movable diaphragm vane forming an exposure aperture optically aligned with said focusing means, the size of said aperture being a function of the position of said vane; sensing means connected to said vane for movement in a predetermined path to sense the position of said control member upon movement of said vane, for determining the size of said aperture; an actuating device accessible to the camera operator; drive means connected to said vane and controlled by said actuating device, in response to movement of the latter, for moving said vane and for moving said sensing means into engagement with said control member; override means adapted for movement into the path of said sensing means for intercepting said sensing means irrespective of the position of said control member; and manually operable selecting means coupled to said override means for moving the latter into said path.

15. The combination defined in claim 12 with a cam surface connected to said sensing means for engaging said override means upon movement of the latter into said path when said sensing means is in its sensing position.

16. The combination defined in claim 13 with indicator means coupled to said selecting means and adapted to be moved relative to a viewing locus in response to movement of said override means into and out of said path.

17. In a camera having a lens system for focusing an image of a viewed scene onto a photosensitive surface; a photoelectric-to-mechanical transducer positioned for energization by light from said scene, with a mechanical output member constituting a part of said transducer and positioned thereby as a function of the intensity of said light; adjustable means aligned with said lens system for regulating the exposure of said photosensitive surface; and an actuating devices accessible to the camera operator; the combination comprising: means for temporarily operating said actuating device; driving means interrelating said actuating device and said regulating means and operable, in response to operation of said actuating device, for yieldably driving a part of said regulating means through a predetermined path into engagement with said output member to limit the adjustment of said regulating means as a function of the position of said output member; override means adapted to be moved into and out of the path of said part of the regulating means and operable, upon being positioned in said path, for intercepting said part to limit the adjustment of said regulating means irrespective to the position of said output member; and manually operable selecting means coupled to said override means for positioning the latter.

18. A light-controlled photographic diaphragm stop regulator comprising: a photoelectrically displaceable control member controlled in response to the ambient light level of a scene to be photographed, a pair of vanes having portions defining a completely peripherally enclosed aperture therebetween the size of which varies with the relative position of said vanes, said vanes being adapted to be positioned such that said aperture is interposed in the path of light through a lens being controlled, an actuator member which displaces said vanes and enables said control member to move therebetween and out of contact with said vanes in response to said light level, whereby on actuation of said actuator said vanes are no longer displaced thereby, and means to move said vanes relative to one another upon actuation of the actuator to define an aperture the size of which is determined by the position of said control member through said vanes contacting said control member.

19. In an automatic exposure control device, galvanometer means, a member driving by the galvanometer means, a movable diaphragm blade having a portion for engaging the member and also having a tapered diaphragm opening, means mounting the blade for movement independently of the galvanometer means, and manually operable means for moving the blade in a closing direction into enegagement with the member, said portion of the blade and the member being provided with cam-shaped interlocking portions for stopping the blade in a position determined by the position of the member, the interlocking portion of the member constituting a stop for limiting movement of the blade in a closing direction.

20. In an automatic exposure control device, a diaphragm blade having a tapered aperture and mounted pivotally, manually operable means for urging the blade in a diaphragm closing direction, a galvanometer having a rotatable portion, a cam carried by one of the blade and the rotatable portion, and a member carried by the other of the blade and the rotatable portion for engaging with the cam to limit movement of the blade in accordance with the position of the rotatable portion of the galvanometer.

21. In an automatic exposure control device, a mounting plate, a galvanometer mounted on the plate and having a rotatable coil, a diaphragm blade having a tapered opening and mounted pivotally on the plate at a point spaced from the galvanometer, manually operable means for urging the blade in a closing direction, and interengaging cam means carried by the coil and the blade for limiting closing movement of the blade in accordance with the rotative position of the coil.

22. In an automatic exposure control device, galvanometer means, a member driven by the galvanometer means, a movable diaphragm blade having a portion for engaging the member and also having a tapered diaphragm opening, means mounting the blade for movement independently of the galvanometer means, and manually operable means for moving the blade in a predetermined direction into engagement with the member, said portion of the blade and the member being provided with cam-shaped interlocking portions for stopping the blade in a position determined by the position of the member, the interlocking portion of the member constituting a stop for limiting movement of the blade in said predetermined direction.

23. In an automatic exposure control device, a diaphragm blade having a tapered aperture and mounted pivotally, manually operable means for urging the blade in a predetermined direction, a galvanometer having a rotatable portion, a cam carried by one of the blade and the rotatable portion, and a member carried by the other of the blade and the rotatable portion for engaging with the cam to limit movement of the blade in accordance with the position of the rotatable portion of the galvanometer.

24. In an automatic exposure control device, a mounting plate, a galvanometer mounted on the plate and having a rotatable coil, a diaphragm blade having a tapered opening and mounted pivotally on the plate at a point spaced from the galvanometer, manually operable means for urging the blade in a predetermined direction, and interengaging cam means carried by the coil and the blade for limiting movement of the blade in accordance with the rotative position of the coil.

References Cited by the Examiner
UNITED STATES PATENTS

| | | | |
|---|---|---|---|
| 24,356 | 6/1859 | Wirshing et al. | 95—64 |
| 433,745 | 8/1890 | Schneider | 95—53 |
| 2,185,847 | 1/1940 | Harrison et al. | 95—64 X |
| 2,838,985 | 6/1958 | Burger et al. | 95—64 |
| 2,841,064 | 7/1958 | Bagby et al. | 95—64 |

FOREIGN PATENTS

| | | |
|---|---|---|
| 842,887 | 11/1952 | Germany. |
| 216,966 | 1/1942 | Switzerland. |

NORTON ANSHER, *Primary Examiner.*

DELBERT B. LOWE, EVON C. BLUNK, EMIL G. ANDERSON, *Examiners.*

E. E. FULLER, L. W. VARNER, C. B. PRICE,
*Assistant Examiners.*